United States Patent
Pamphile et al.

(10) Patent No.: US 12,073,717 B2
(45) Date of Patent: Aug. 27, 2024

(54) AUTOMATED MOTOR VEHICLE SERVICES AND PARKING TICKETS

(71) Applicants: William Pamphile, Malden, MA (US); Lande Pamphile, Malden, MA (US); Willande Pamphile, Malden, MA (US); William Pamphile, II, Malden, MA (US); Wilmayer Pamphile, Malden, MA (US)

(72) Inventors: William Pamphile, Malden, MA (US); Lande Pamphile, Malden, MA (US); Willande Pamphile, Malden, MA (US); William Pamphile, II, Malden, MA (US); Wilmayer Pamphile, Malden, MA (US)

( * ) Notice: Subject to any disclaimer, the term of this patent is extended or adjusted under 35 U.S.C. 154(b) by 358 days.

(21) Appl. No.: 17/090,872

(22) Filed: Nov. 5, 2020

(65) Prior Publication Data

US 2022/0138883 A1 May 5, 2022

(51) Int. Cl.
*G08G 1/00* (2006.01)
*G06Q 10/0631* (2023.01)
(Continued)

(52) U.S. Cl.
CPC ..... *G08G 1/0175* (2013.01); *G06Q 10/06315* (2013.01); *G06Q 10/109* (2013.01);
(Continued)

(58) Field of Classification Search
None
See application file for complete search history.

(56) References Cited

U.S. PATENT DOCUMENTS

| | | | | |
|---|---|---|---|---|
| 5,432,508 A | * | 7/1995 | Jackson | G08G 1/146 377/9 |
| 6,911,133 B1 | * | 6/2005 | Grison | G06Q 20/40 705/40 |

(Continued)

OTHER PUBLICATIONS

Mutua, Simon Mandi. An automatic number plate recognition system for car park management. Diss. Strathmore University, 2016. (Year: 2016).*

(Continued)

*Primary Examiner* — Gurkanwaljit Singh
(74) *Attorney, Agent, or Firm* — Lambert Shortell & Connaughton; David J. Connaughton, Jr.; Justin P. Tinger

(57) ABSTRACT

A system and method for providing an automated motor vehicle notifications and services system obtains photograph of a vehicle license plate for a violating vehicle, accepts input defining a violation associated with the violating vehicle to generate an electronic parking ticket, transmits the photograph and the electronic parking ticket to a web-based computing system associated with a parking authority, when the license plate indicates an out of state vehicle registration, obtains an online address associated with a state motor vehicle authority in a state matching the license plate, transmits the photograph and electronic ticket to the appropriate state motor vehicle authority, verifies the license plate matches the violating vehicle, when the license plate does not match the violating vehicle, notifies a responsible agent to dispatch a tow truck to remove the violating vehicle, and transmits the photograph and the electronic parking ticket to a web-based driver notification computing system instructing the driver notification computing system to serve notice of the electronic ticket on an owner of the violating vehicle.

5 Claims, 17 Drawing Sheets

(51) Int. Cl.

| | | |
|---|---|---|
| *G06Q 10/109* | (2023.01) | |
| *G06Q 20/04* | (2012.01) | |
| *G06Q 30/018* | (2023.01) | |
| *G06Q 30/0283* | (2023.01) | |
| *G06Q 50/18* | (2012.01) | |
| *G06Q 50/26* | (2012.01) | |
| *G06V 20/62* | (2022.01) | |
| *G07B 15/02* | (2011.01) | |
| *G08G 1/017* | (2006.01) | |
| *H04L 67/12* | (2022.01) | |
| *G06K 7/14* | (2006.01) | |

(52) U.S. Cl.
CPC ....... *G06Q 20/0457* (2013.01); *G06Q 30/018* (2013.01); *G06Q 30/0284* (2013.01); *G06Q 50/18* (2013.01); *G06Q 50/265* (2013.01); *G06V 20/62* (2022.01); *G07B 15/02* (2013.01); *H04L 67/12* (2013.01); *G06K 7/1413* (2013.01); *G06K 7/1417* (2013.01); *G06V 20/625* (2022.01)

(56) References Cited

U.S. PATENT DOCUMENTS

| | | | | |
|---|---|---|---|---|
| 8,302,847 | B2* | 11/2012 | Johnson | G08G 1/14 |
| | | | | 235/375 |
| 8,803,659 | B2 | 8/2014 | Hill | |
| 9,997,071 | B2* | 6/2018 | Wang | G08G 1/096775 |
| 11,232,301 | B2* | 1/2022 | Cohen | H04N 7/18 |
| 2003/0055701 | A1* | 3/2003 | Dutta | G06Q 30/0284 |
| | | | | 705/1.1 |
| 2004/0068433 | A1* | 4/2004 | Chatterjee | G06Q 20/127 |
| | | | | 705/13 |
| 2004/0252193 | A1* | 12/2004 | Higgins | G08G 1/054 |
| | | | | 348/149 |
| 2008/0238719 | A1* | 10/2008 | Marchasin | G08G 1/017 |
| | | | | 340/901 |
| 2008/0308631 | A1 | 12/2008 | Mitschele et al. | |
| 2009/0026254 | A1* | 1/2009 | Johnson | G08G 1/017 |
| | | | | 235/375 |
| 2010/0149334 | A1* | 6/2010 | Wirsz | G08G 1/04 |
| | | | | 348/143 |
| 2014/0039987 | A1* | 2/2014 | Nerayoff | G07F 17/24 |
| | | | | 348/148 |
| 2014/0132767 | A1* | 5/2014 | Sonnabend | G06V 20/63 |
| | | | | 348/148 |
| 2014/0257943 | A1* | 9/2014 | Nerayoff | G06T 7/73 |
| | | | | 382/104 |
| 2014/0324714 | A1* | 10/2014 | Kimball | G06Q 50/163 |
| | | | | 705/314 |
| 2014/0335897 | A1* | 11/2014 | Clem | H04W 4/021 |
| | | | | 455/456.3 |
| 2015/0138001 | A1* | 5/2015 | Davies | G08G 1/146 |
| | | | | 340/932.2 |
| 2015/0310070 | A1* | 10/2015 | Stefik | G06Q 10/06 |
| | | | | 707/740 |
| 2016/0133085 | A1 | 5/2016 | Eagon et al. | |
| 2016/0232785 | A1* | 8/2016 | Wang | G08G 1/0129 |
| 2017/0098376 | A1* | 4/2017 | Wang | G08G 1/0129 |
| 2018/0211117 | A1* | 7/2018 | Ratti | G06V 10/764 |
| 2019/0174279 | A1 | 6/2019 | Verma et al. | |
| 2021/0394764 | A1* | 12/2021 | Clines | B60W 40/08 |

OTHER PUBLICATIONS

Singh, Iqbal. "Automatic vehicle detection and recognition." (2016). (Year: 2016).*

Decina, Larry E., et al. "Automated enforcement: A compendium of worldwide evaluations of results." (2007). (Year: 2007).*

* cited by examiner

300

Feature applications to be developed in the future under→Peaceful Technology Services (PTS)

| Searching & Update info: | | Send bit for home insurance |
|---|---|---|
| ☐ Update my info------including Address — 301a | | ☐ Send bit for life insurance |
| ☐ Update my car info — 301b | | ☐ Camera view in the system |
| ☐ Learning services | | ☐ Search for Lawyers |
| ☐ Request Copy of Social Security — 302a | | ☐ Record car inspection automatically |
| ☐ Request work permit | | ☐ Meeting with other |
| ☐ Request a work permit — 302b | | ☐ Send a bit for car insurance |
| ☐ Renew plate & registration | | ☐ To be able to view all receipts |
| ☐ Copy of Driver License — 301c | | ☐ Pay Tax year of — 302d |
| ☐ License Renew | | ☐ Advertising site for business & private |
| ☐ Driving Record — 301d | | ☐ One on one Adults Companionship Services (hourly, daily, and weekly). |
| ☐ Taking Driving Exam — 301e | | ☐ Birth Certificate — 302c |

To obtain a temporary License plate, the documents should be downloaded to the Motor Registry and mail original by certified mail immediately. The temporary plate will have a number and an expiration date.
Follow the tracking number in myinfo app. with the same day or overnight delivery.

☐ Copy of tax year ———
☐ Washing movies

The system will always be updated in the morning around 2 am.

Register in "mydriving.com"

First name_____ Last name_____ — 401

Address_____ City_____ — 402
State_____ Zip code_____
E-mail 1_____ Cell #_____

Car 1 — 403a
Make_____ Model_____
Color_____ Plate #_____ Van#_____

Car 2 — 403b
Make_____ Model_____
Color_____ Plate #_____ Van#_____

Car 3 — 403c
Make_____ Model_____
Color_____ Plate #_____ Van#_____

NB→ If the car model, plate#, color & van # do not match with the registry of motor vehicle, the registration will not be completed. Please download the car registration.
— 404
☐ Agreed that nobody can sued the Automatic Ticket Plate Technology (ATPT) for any errors.

| Original Photo 405a | Direct Picture for verification By phone Successfully Or Error message | Password must be 8 words and 3 of ! @ # $ % & * (Lock after 3 attempts) 405b | Warning/Ticket ☑ Car 1 Ticket-Alert ☐ Car 2 Ticket-Alert ☐ Car 3 Ticket-Alert ☐ Reset password ☐ Report broken meter 405c | Remove vehicle #____ of service Vehicle Name_____ Date_____ Model:_____ Color:_____ Plate #_____ Returned on_____ Where is vehicle:_____ If sale to whom:_____ Address_____ If Trashed/or accident, where_____ 405d |
|---|---|---|---|---|
| Driving Status: ☐ Active ☐ Not Active | Vehicle status ☐ Good ☐ Bad | Insurance ☐ Active ☐ Cancelled | 30 Days Alert for *Renew Driver License *Inspection Sticker *Plate Registration | 24 hours Alert *Street Cleaning *Snow Alert Receipts @reading |

Part 2—> " Making Payment Now or Request Hearing"

Enter your name as it appears in the credit card. — 501

First name_____ Last name_____
Address_____ City_____
States_____ Zip code_____

☐ Using new card  or  ☐ Using previous card — 502
Type of credit card  ☐ Visa  ☐ Master  ☐ Discover  ☐ American Exp.

Enter credit card #_____ Zip code_____
Enter expiration date_____ Last 3 # in the back_____ ☐ Save card info
— 503

| # of "V" Tickets | # of Tickets | Click to View | Amount | Late fees | Add. fees | Total amount |
|---|---|---|---|---|---|---|
| Vehicle 1 2 3 4 | | | Amount | Late fees | Add. fees | Total amount |
| Pay Excise Tax for vehicle 1 2 3 ☑ ☐ ☑ — 504a | | ☐ | $ | $ | $ | $ |
| Pay Booth Ticket ☐ Pay Booth fees | 2 | ☐ | $ | $ | $ | $ |
| Pay Parking Ticket 1 ☐ Appeal for Hearing | 3 | ☑ | $ $ | $ $ | $ $ | $ $ |
| Pay Moving Violation 1 ☐ Appeal for Hearing | 2 | ☐ | $ $ | $ $ | $ $ | $ $ |
| Pay Residence P. Ticket ☐ Appeal for Hearing | 3 | ☐ 1 | $ $ | $ $ | $ $ | $ $ |
| Other Tickets Ticket #_____ City | 5 | | $ | $ | $ | $ |

Please allow approximately 1 to 5 minutes to release the car to you

Payment successful — 505  Payment declined
(Showing red)

☐ Send receipt to my e-mail  ☑ Automatically Save info 504b, 504c, 504d, 504e, 504f

Password Information

1st Set up password

Please select and answer three unique security questions. We will ask you to answer these questions if you forget your log in information. Security answers must meet the following criteria:

Security answers
You cannot use the same security answer twice.
Make sure that you can always remember your answered.

[Update Security Questions]

— 701a

Question 1: [What is the city where you were born? ▼]
Answer 1: [_____] Old answered in the data base Question 1: [What is the city where you were born? ▼]
Answer 1: [_____] New answer — 701b Question 2: [To what city did you go the first time you flew on a plane? ▼]
Answer 2: [_____] Old answered in the data base Question 2: [To what city did you go the first time you flew on a plane? ▼]
Answer 2: [_____] New answer — 701c Question 3: [In what city or town was your first job? ▼]
Answer 3: [_____] Old answered in the data base Question 3: [In what city or town was your first job? ▼]
Answer 3: [_____] New answer

| 1st attempt-> Failed | 2nd Attempt->Failed |

Your account has been locked due to several attempts. Please contact the help desk at 800.000-0000

Searching Information

| If the meter is not working, can I still park my vehicle without getting a ticket? |

A→Yes. However when you park your vehicle in the broken meter, make sure you go to your "mydriving app account" to take a close picture of the broken meter and the vehicle plate number and send it to the authority to notify them. The location, the zone, date, and time will appear once you take the picture of the meter. Once the meter is repaired, the system will notify you and allow you (1) one free hour to come to feed the meter, after the free one-hour, the vehicle may be ticketed if meter is not feeding.

What happen if I parked my vehicle and did not report the broken meter?

A→ Once the meter has been repaired, your vehicle will be ticketed, and you will be notified about the ticket.

Can ticket agent remove a ticket that was inputted into the system by error?

A→ Yes. The ticket agent has 24 hours to write a memo to motor vehicle and ask to dismiss that ticket because it was issued by error.

Can I park my vehicle in a prepay meter spot to make an emergency call or text?

A→ No. Because the meter has is a prepaid meter and scheduled to be used.

Can I park my vehicle in a regular meter to make an emergency call or text?

A→ Yes. If the meter is not a prepay meter. The ticket agent will allow you 10 minutes in the meter spot to make an emergency phone call or text. The ticket agent will scan the meter and the car plate to start the 10 minutes. After the 10 minutes, the car will be ticketed, and you will be notified immediately of that ticket.

How to pay my ticket through "mydriving.com?

First you must go to "mydriving.com" to register and follow the instructions.

Can I ignore a traffic or parking tickets?

A→ No. When someone ignores a traffic or traffic tickets, it does not go away. It remains in effect and can cause you to lose your license, pay additional fines and even be arrested! The way people sometimes run into more serious legal problems is when they do not pay the citation or contact the court to dispute the ticket.

What happens if I do not pay my ticket?

A→ If you do not pay your traffic ticket, many of the following actions can be taken again you.
• The court can request that the department of vehicles suspend your driver's license
• A warrant for your arrest may be issued
• Additional fines may be imposed

Do I have to pay an out of State ticket?

Yes. Regardless of where you live in the United States, you can pay your violation ticket.

Can I dispute my ticket violation?

Yes. You can request a hearing. If you need contact a lawyer for your case, click to view list of lawyers in the community you live. (List of lawyers will appear)

Can the system notify me before the due date of the ticket to pay or request hearing?

A→Yes. The new technology system will notify you 24 hours in advance before late fees apply in any tickets. Once a warning has been issued against you, the app will notify you.

Do I have to appear in court when received a ticket?

A→ No. If you paid the ticket before the due date, you do not have to appear in court.

Do I have to appear in court when requesting a hearing for my ticket?

A→ No. If you plan to dispute the ticket, you need to request the court hearing in mydriving.com before the due date of the ticket to prevent penalties or sanctions.

Can I dispute a ticket after the due date passed?

FIG. 8c

850 

A→ No. Once the due date of the ticket passed, you will not be able to request a court hearing. You need to be paid with any additional fees.

How to pay my ticket page?

Click on Pay My Ticket.

Should I hire an attorney to represent me for my violation ticket?

A→ Only if it is a serious violation where your license is at risk. It would be best to hire a lawyer to help protect your rights. Click (here) to select the list of lawyers in the area.

I parked my vehicle here now I do not see it.
A→ If the authority tows your vehicle, you will be notified through your "mydriving.com.
If you did not get any alert from the authority or towing company, you should contact your local police immediately to report that your vehicle has been missing.

Alert Before Towing→ABT

If you park your vehicle in the meter or in any right place, and the authority has an emergency where you need to move your vehicle immediately. The authority will send you an Alert base on the plate number to remove your vehicle now. You will be able to reply back " I am coming in 5 to 10 minutes. If in case the authority is unable to wait for you, they can tow your vehicle to another place at no charge to you.

⊞ This is the violation code.

| Click on the picture signs to record to the zone locations. | | | | Location 1 | Loc. 2 | Loc. 3 | Loc. 4 | Loc. 5 | Loc. 6 |
|---|---|---|---|---|---|---|---|---|---|
| Code | Abv | Citation name | Fees | Zone A1 | Zone B2 | Zone C3 | Zone D4 | Zone E5 | Zone F6 | Zone G7 |
| 01 | PME | Parking Meter Expired | $ | | | | | | |
| 02 | HDPT | Hand Driving Phone & Texting | $ | | | | | | |
| 03 | RPO | Resident Parking Only | $ | | | | | | |
| 04 | ST | Street Cleaning | $ | Each City has a zone et each zone stores his own database. The system will save the best picture taking for the database.  Once the sign pictures are recorded, when a Police officers or Personnel agents are ticketed, they will click on the plate and select the code number and send the ticket.  Similarity Sharp  1010 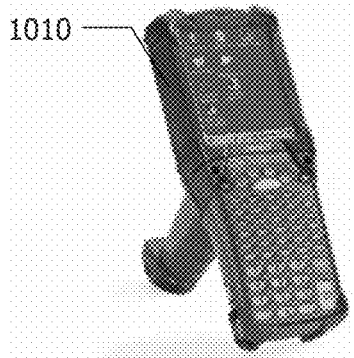 | | | | | |
| 05 | DP | Double Park | $ | | | | | | |
| 06 | RRL | Run Red Light | $ | | | | | | |
| 07 | SV | Exceed Speed Limit | $ | | | | | | |
| 08 | NPV | No Parking Zone | $ | | | | | | |
| 09 | NVPP | No Valid Parking Permit | $ | | | | | | |
| 10 | PFL | Parked Fire Lane | $ | | | | | | |
| 11 | HP | Handicapped Parking | $ | | | | | | |
| 12 | ABT | Alert Before Towing | $ | | | | | | |
| 13 | PRS | Parked Reserve Space | $ | | | | | | |
| 14 | BD | Blocking Driveway | $ | | | | | | |
| 15 | BOV | Blocking Other Vehicle | $ | | | | | | |
| 16 | P2S | Parked in 2 spaces | $ | | | | | | |
| 17 | MUCS | Moving Unclean Car Snow | $ | | | | | | |
| 18 | ELP | Expired License Plate | $ | | | | | | |
| 19 | DWLS | Driving with License Suspended | $ | | | | | | |
| 20 | FSS | Failure Stop Sign | $ | | | | | | |
| 21 | DWSM | Drive Without Side Mirror | $ | | | | | | |
| 22 | NUT | No U Turn | $ | | | | | | |
| 23 | HC | Honking Constantly | $ | | | | | | |
| 24 | RWH | Ride Without Helmet | $ | | | | | | |
| 25 | DWI | Driving Without Insurance | $ | | | | | | |
| 26 | SFUT | Stop For Unpaid Ticket | $ | | | | | | |
| 27 | DWOH | Driving With One Headlight On | $ | | | | | | |
| 28 | DWNH | Driving With No Headlights | $ | | | | | | |
| 29 | VPIFH | Vehicle Park in Fire Hydrant | $ | | | | | | |
| 30 | HRV | Hit & Ran Vehicle | $ | | | | | | |
| 31 | DDR | Driving Dangerously Racing | $ | | | | | | |
| 32 | PVITS | Parking Vehicle In Taxi Spot | $ | | | | | | |
| 33 | SE | Snow Emergencies | $ | | | | | | |
| 34 | EVS | Expired Vehicle Stickers | $ | | | | | | |
| 35 | PINPZ | Park In No Parking Zone | $ | | | | | | |
| 36 | DWNL | Driving With No License | $ | | | | | | |

| Click on the picture signs to record to the zone location. | | | | Location 1 | Loc. 2 | Loc.3 | Loc.4 | Loc.5 | Loc.6 |
|---|---|---|---|---|---|---|---|---|---|
| Code | ABV | Citation name | Fees | Zone A1 | Zone B2 | Zone C3 | Zone D4 | Zone E5 | Zone F6 | Zone G7 |
| 37 | OTG | Over Tinted Glasses | $ | | | | | | |
| 38 | DOD | Driving Opposite Direction | $ | | | | | | |
| 39 | ULC | Unsafe Lane Change | $ | | | | | | |
| 40 | DNTOR | Do Not Turn On Red | $ | | | | | | |
| 41 | DOUH | Driver Over Used Horn | $ | | | | | | |
| 42 | DD | Driving Drunk | $ | | | | | | |
| 43 | DUI | Driving Under Influence | $ | | | | | | |
| 44 | OV | Oversized Vehicle #------ | $ | | | | | | |
| 45 | PNSB | Passengers No Seat Belt | $ | | | | | | |
| 46 | DNWSB | Driver Not Wearing Seat Belt | $ | | | | | | |
| 47 | DWR | Driving Without Registration | $ | | | | | | |
| 48 | DVWP | Driving Vehicle with no Plate | $ | | | | | | |
| 49 | TWD | Texting While Driving | $ | | | | | | |
| 50 | RRL | Running Red Light | $ | | | | | | |
| 51 | LOP | Light Out Plate | $ | | | | | | |
| 52 | PBSB | Passing by School Bus | $ | | | | | | |
| 53 | DWL | Driving Without License | $ | | | | | | |
| 54 | NPA | No Parking Allow | $ | | | | | | |
| 55 | | More and more....... | | | | | | | |
| 56 | | | | | | | | | |
| 57 | | | | | | | | | |
| 58 | | | | | | | | | |
| 59 | | | | | | | | | |
| 60 | | | | | | | | | |

FIG. 11

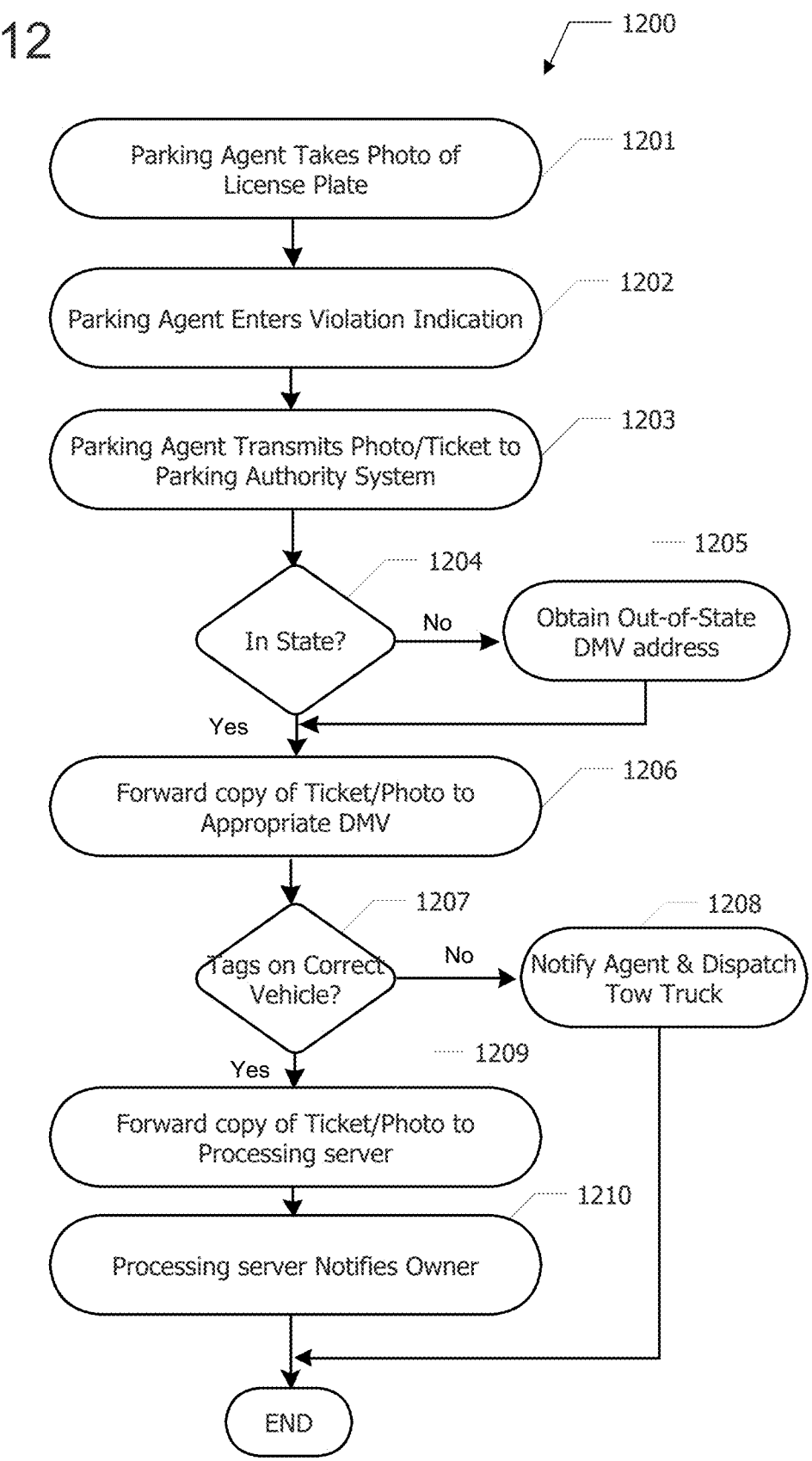

AUTOMATED MOTOR VEHICLE SERVICES AND PARKING TICKETS

TECHNICAL FIELD

This application relates in general to a system and method for providing remote governmental services, and more specifically, to a system and method providing a remote license plate, parking ticket, and warning notifications system.

BACKGROUND

New technology systems may be designed to provide amazing services and resources to people in need 24/7. The goal of this technology is to inspire, educate, connect, and change the way people interact daily while offering quality products and services to customers with transparency. Via this new technology, people will conduct government business activities from the comfort and safety of their own homes. The core functions will help user's manage their time more effectively, avoid conflict, and reduce stress in their daily lives. This technology is fast and convenient and will reduce or eliminate crowds in a jurisdiction's division of motor vehicle services, court system, and administrative offices.

Therefore, a need exists for a system and method providing a remote license plate, parking ticket, and warning notifications system. The present invention attempts to address the limitations and deficiencies in existing systems to provide governmental services according to the principles and example embodiments disclosed herein.

SUMMARY

In accordance with the present invention, the above and other problems are solved by providing a system and method for a remote license plate, parking ticket, and warning notifications system according to the principles and example embodiments disclosed herein.

In one embodiment, the present invention is a system providing a remote license plate, parking ticket, and warning notifications system. The system obtains photograph of a vehicle license plate for a violating vehicle, accepts input defining a violation associated with the violating vehicle to generate an electronic parking ticket, transmits the photograph and the electronic parking ticket to a web-based computing system associated with a parking authority, when the license plate indicates an out of state vehicle registration, obtains an online address associated with a state motor vehicle authority in a state matching the license plate, transmits the photograph and electronic ticket to the appropriate state motor vehicle authority, verifies the license plate matches the violating vehicle, when the license plate does not match the violating vehicle, notifies a responsible agent to dispatch a tow truck to remove the violating vehicle, and transmits the photograph and the electronic parking ticket to a web-based driver notification computing system instructing the driver notification computing system to serve notice of the electronic ticket on an owner of the violating vehicle.

In another embodiment, the present invention is a method for providing a remote license plate, parking ticket, and warning notifications system. The method obtains photograph of a vehicle license plate for a violating vehicle, accepts input defining a violation associated with the violating vehicle to generate an electronic parking ticket, transmits the photograph and the electronic parking ticket to a web-based computing system associated with a parking authority, when the license plate indicates an out of state vehicle registration, obtains an online address associated with a state motor vehicle authority in a state matching the license plate, transmits the photograph and electronic ticket to the appropriate state motor vehicle authority, verifies the license plate matches the violating vehicle, when the license plate does not match the violating vehicle, notifies a responsible agent to dispatch a tow truck to remove the violating vehicle, and transmits the photograph and the electronic parking ticket to a web-based driver notification computing system instructing the driver notification computing system to serve notice of the electronic ticket on an owner of the violating vehicle.

The foregoing has outlined rather broadly the features and technical advantages of the present invention in order that the detailed description of the invention that follows may be better understood. Additional features and advantages of the invention will be described hereinafter that form the subject of the claims of the invention.

It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only, and is not intended as a definition of the limits of the present invention.

BRIEF DESCRIPTION OF THE DRAWINGS

Referring now to the drawings in which like reference numbers represent corresponding parts throughout:

FIG. 3 illustrates an example embodiment of an electronic document available to mobile application users to obtain motor vehicle services according to the present invention.

FIG. 4 illustrates an example embodiment of an electronic document available to mobile application users to notify a user of a parking ticket according to the present invention.

FIG. 5 illustrates an example embodiment of an electronic document to request a hearing or to pay a parking ticket according to the present invention.

FIG. 7 illustrates an example embodiment of an electronic document to set up or update a driver's account information within the system according to the present invention.

FIG. 8a-d illustrate an example embodiment of an electronic document to provide help to and a mechanism by which a user may update an account password for the system 100 according to the present invention.

FIG. 10 illustrates an example embodiment of an electronic document to request a hearing or to pay a parking ticket according to the present invention.

FIG. 11 illustrates an example embodiment of an electronic document to request a hearing or to pay a parking ticket according to the present invention.

FIG. 12 illustrates a flowchart corresponding to a method performed by software components in a system providing automated parking ticket issuance according to the present invention.

DETAILED DESCRIPTION

Figure 1:
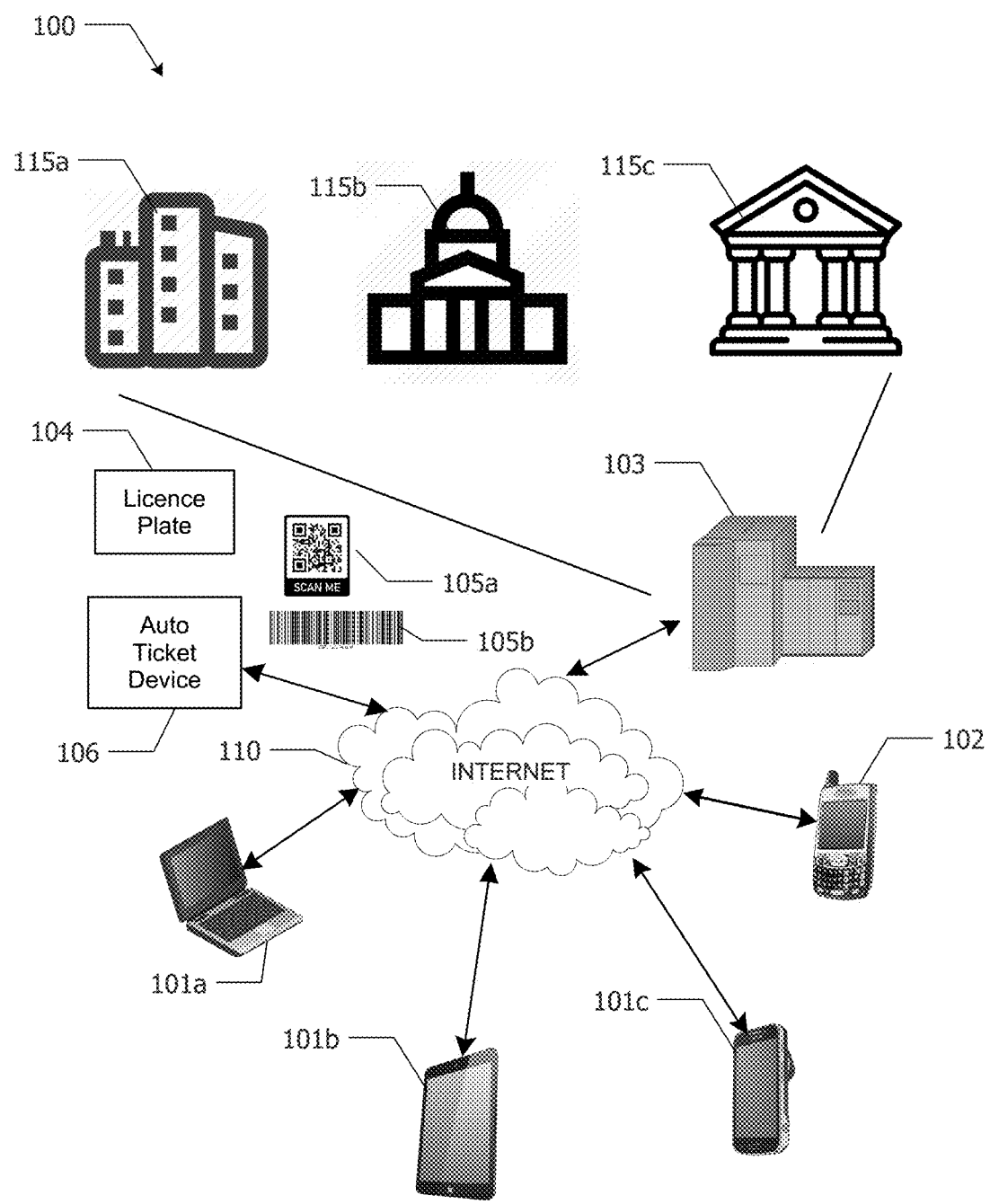
FIG. 1 illustrates a distributed processing system to provide remote governmental services according to the present invention.

This application relates in general to a system and method for providing governmental motor vehicle services, and more specifically, to a system and method providing a remote license plate, parking ticket, and warning notifications system according to the present invention.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In describing embodiments of the present invention, the following terminology will be used. The singular forms "a," "an," and "the" include plural referents unless the context clearly dictates otherwise. Thus, for example, reference to "a needle" includes reference to one or more of such needles and "etching" includes one or more of such steps. As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. As used herein, the singular forms "a," "an," and "the" are intended to include the plural forms as well, unless the context clearly indicates otherwise.

It further will be understood that the terms "comprises," "comprising," "includes," and "including" specify the presence of stated features, steps or components, but do not preclude the presence or addition of one or more other features, steps or components. It also should be noted that in some alternative implementations, the functions and acts noted may occur out of the order noted in the figures. For example, two figures shown in succession may in fact be executed substantially concurrently or may sometimes be executed in the reverse order, depending upon the functionality and acts involved.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "50-250 micrometers" should be interpreted to include not only the explicitly recited values of about 50 micrometers and 250 micrometers, but also include individual values and sub-ranges within the indicated range. Thus, included in this numerical range are individual values such as 60, 70, and 80 micrometers, and sub-ranges such as from 50-100 micrometers, from 100-200, and from 100-250 micrometers, etc.

Unless otherwise indicated, all numbers expressing quantities of ingredients, properties such as molecular weight, percent, ratio, reaction conditions, and so forth used in the specification and claims are to be understood as being modified in all instances by the term "about," whether or not the term "about" is present. Accordingly, unless indicated to the contrary, the numerical parameters set forth in the specifications and claims are approximations that may vary depending upon the desired properties sought to be obtained by the present disclosure. At the very least, and not as an attempt to limit the application of the doctrine of equivalents to the scope of the claims, each numerical parameter should be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the testing measurements.

As used herein, the term "about" means that dimensions, sizes, formulations, parameters, shapes, and other quantities and characteristics are not and need not be exact, but may be approximated and/or larger or smaller, as desired, reflecting tolerances, conversion factors, rounding off, measurement error and the like, and other factors known to those of skill. Further, unless otherwise stated, the term "about" shall expressly include "exactly," consistent with the discussion above regarding ranges and numerical data.

The term "mobile application" refers to an application executing on a mobile device such as a smartphone, tablet, and/or web browser on any computing device.

The terms "individual" and "user" refer to an entity, e.g. a human, using the remote license plate, parking ticket, and warning notifications system including any software or smart device application(s) associated with the invention. The term user herein refers to one or more users.

The term "connection" refers to connecting any component as defined below by any means, including but not limited to, a wired connection(s) using any type of wire or cable for example, including but not limited to, coaxial cable(s), fiberoptic cable(s), or ethernet cable(s) and wireless connection(s) using any type of frequency/frequencies or radio wave(s). Some examples are included below in this application.

The term "invention" or "present invention" refers to the invention being applied for via the patent application with the title "Automated Motor Vehicle Services and Parking Tickets." Invention may be used interchangeably with official parking app.

The terms "communicate", and "communication" refer to any component(s) connecting with any other component(s) in any combination for the purpose of the connected components to communicate and/or transfer data to and from any components and/or control any settings.

In general, the present disclosure relates to a system and method for providing remote governmental services. To better understand the present invention, FIG. 1 illustrates a distributed processing system to provide remote governmental services according to the present invention. Governments at various levels require individuals to interact with many different institutions in a particular government. Consider an example of individuals who own a vehicle that is used for personal activities. The individual may be required to interact with a Department of Motor Vehicles (DMV) 115a to obtain license plates, a title, and a registration for the vehicle as well as a driver's license for themselves. The individual also may be required to interact with City Hall 115b for obtaining parking permits and paying parking tickets. Lastly, the individual may be required to interact with local courts 115c to handle adjudication of parking tickets and related matters.

Each of these entities may have separate procedures and methods of interacting with individuals even when they are both handling parts of the same matter, for example a parking ticket. These arrangements cause individuals to expend excessive amounts of time and effort to handle any governmental action.

Governments have attempted to make interacting with these institutions easier by providing an online presence in the form of a web server 103 that individuals may interact with using a computing device connected to the Internet 110. These computing devices may include personal computers 101a, tablets 101b, and smartphones 101c, among others. The various governmental institutions 115a-c may utilize a shared server 103 or operate on their own computing devices. However, they typically provide separate web sites that are not well coordinated to seamlessly permit an individual to interact with all relevant institutions when handling a single matter.

Additionally, government employees are required to enter information into these servers 103 that is processed into a system for relevant institutions. These employees interact with these web sites using computing devices as well. For example, a parking enforcement agent, sometimes referred to affectionately as a meter maid, issues parking tickets when a vehicle has overstayed its time in a parking spot, or a person has improperly parked the vehicle for some reason. These parting tickets may be handwritten, and a copy left on the vehicle with the official copy returned to an office where the information is entered into one or more relevant computing systems.

Processes also may permit these parking enforcement agents to issue these tickets using a mobile application on a hand-held device 102. In some embodiments, the hand-held devices 102 also may include a printer that generates a written copy to be left on the vehicle to be found when the owner returns. These hand-held devices 102 also may communicate with the various web sites 103 to share information related to the ticket. The present invention is a single distributed computing system 100 that integrates all of these users and interactions into a single system without artificial separation between the relevant governmental institutions.

Automatic Ticket Plate Technology is designed to administer the way the ticket violation process works in Massachusetts and the United States, and may be used in lot of countries around the world to increase communication and transparency among all parties such as law enforcement agencies, traffic control agencies, courts, and consumers via a simple smartphone app and a hand-held device that can connect consumers with a variety of services, including but not limited to: ??

A user is alerted immediately on his/her phone when receiving a ticket violation, and can view the ticket violation, pay the fine right away or appeal the ticket and request a hearing. Consumers also can request and pay for towing services. The app provides a list of towing companies in the area, a receipt for ticket payment, and notification of any hearing with date, time, and location. Users receive an alert 24 hours before a hearing and an alert 24 hours before an unpaid ticket begins to accrue additional fees. Via the app, users receive 30-day alerts to renew license plates, car registrations, emissions, and stickers, and 24-hour notice of street cleaning in the area. Users are alerted if the local jurisdiction would like vehicles removed from the streets for any reason. In addition, the app provides a list of lawyers with cell numbers, office phone numbers and email addresses for emergency situations.

The parking enforcement agent's device 102 is a hand-held ticketing device with a 20- to 60-second camera to record any activities with date, time, and location, and images/footage of how a vehicle is in violation of parking or speed regulations. The police officers or the parking agents carry the ticket device 102 to enter a vehicle's plate and select the violation code and send the ticket with the vehicle's photo to a driver's app. A website such as mydriving.com may be established for a driver's mobile device 101a-c to communicate. A copy of the ticket violation is transmitted to the DMV 115a in the state and city where the ticket occurred and also the state in which the vehicle plate number is registered, if different. The system 100 may identify a plate from 0 ft to 300 ft distance in one second, enter the violation code, and send the violation ticket immediately to a driver's app.

This system 100 has day and night modes and works in any kind of weather or lighting. The information that the system collects about any vehicle will be shared with the DMV 115a and saved in the host server 103 to make sure that the system is updated and accurate.

When law enforcement or parking personnel enter a plate and related information into the system and the data do not match the records, the proper authorities are notified immediately, and the vehicle may be towed and impounded.

This system 100 is also connected with the Police Department and related governmental offices 115b. An automated ticket device 106 needs to be placed in every traffic light pool to monitor the traffic violations. If a vehicle took a red light, the automated ticket device 106 would video and record the action with date, time, location, and the speed of the vehicle then send the ticket automatically to the vehicle app. The automated ticket device 106 may issue two tickets violations if speeding was involved while taking the red light, one ticket for taking the red light, and one ticket for speeding. The system 100 has required an automated ticket device 106 to be placed in every highway and Highway Exist to track any vehicle.

The system 100 may include adoption of a new license plate 105 with a bar code 105b or a QR code 105a added in a visible location to allow Police Department 115b to quickly locate a vehicle using scanned data from license plates 104 by automated ticket devices 104 whether the vehicle is moving or parked. The system 100 will also allow DMV 115*a* to located and then place a parking restraining boot (not shown) on a vehicle for unpaid tickets or exercise taxes utilizing vehicle location data from the bar code 115*b*. The system 100 may also generate a warning alert that is sent to the vehicle owner as a ticket otherwise is sent by the system 100 to the vehicle owner's mobile application providing advance notice of pending actions by a governmental agency 115*a-c*. If a vehicle is moving without a license plate 104 on the roads, the system 100 will catch that and notify the Police with video/picture, date, time, location, and the speed of that vehicle. This automated ticket device 106 may also be installed in the stop-arm of school buses and similar vehicles (not shown) to generate a ticket for a moving violation by drivers who by-passed the bus when the red lights start to flash.

After a snowfall, the top of the vehicle should be cleaned before driving on the roads. Any unclean moving vehicle with more than 3 inches of snow, can be reported to the police and motor vehicle by anyone with mydriving.com mobile application. The individual will video the situation and the date, time, location, and the speed will automatically appear and send it to the authority. After reviewing the video, a ticket may send out later to the vehicle mobile application with a copy of the video attached. Only one unclean moving vehicle snow ticket violation can be issued in a day to the same vehicle.

Users having a mydriving.com mobile application on their mobile devices can video an illegal action the time, date, location will automatically appear, and send it to the Police Department 115*b* for follow up.

The ticket also may be sent to a driver's mobile device 101*a-c* if the driver has obtained the mobile app and registered with the system 100. Upon receipt of a notification, the driver may decide whether or not to accept and pay the parking ticket or to appeal the ticket and request a hearing to adjudicate the infraction. When the driver makes his/her decision, the relevant information may be sent to the appropriate governmental institutions. For example, record of the payment of the parking ticket fine may be sent to the DVM 115*a* to reconcile the payment with outstanding tickets. The fees may be sent to a parking office within city hall 115*b*. If the driver chooses to adjudicate the ticket, notice of the decision is sent to the DMV 115*a* as well as to the local courts 115*c* to schedule a hearing. Notice of the hearing may be automatically sent to the driver on a mobile device 101*a-c* as well as to the parking enforcement agent on his/her mobile device 103. These parties may check on the date and time of any hearing as well as its status using the mobile app on their devices 101*a-c*, 102. Integration of all of these functions into a single system makes drivers' interactions easier as well as ensures that all of the relevant information is available to all parties as needed.

The invention may use any type of network such as a single network, multiple networks of a same type, or multiple networks of different types which may include one or more of a direct connection between devices, including but not limited to a local area network (LAN), a wide area network (WAN) (for example, the Internet), a metropolitan area network (MAN), a wireless network (for example, a general packet radio service (GPRS) network), a long term evolution (LTE) network, a telephone network (for example, a Public Switched Telephone Network or a cellular network), a subset of the Internet, an ad hoc network, a fiber optic network (for example, a fiber optic service (often known as FiOS) network), or any combination of the above networks.

Smart devices mentioned herein the present application also may use one or more sensors to receive or send signals; wireless signals such as Bluetooth™, wireless fidelity, infrared, Wi-Fi, or LTE. Any smart device mentioned in this application may be connected to any other component or smart device via wired communications (e.g., conductive wire, coaxial cable, fiber optic cable, ethernet cable, twisted pair cable, transmission line, waveguide, etc.) or a combination of wired and wireless communications. The invention's method and/or system may use a single server device or a collection of multiple server devices and/or computer systems.

The systems and methods described above may be implemented in many different forms of applications, software, firmware, and hardware. The actual software or smart device application codes or specialized control software, hardware or smart device application(s) used to implement the invention's systems and methods is not limiting of the implementation. Thus, the operation and behavior of the systems and methods were described without reference to the specific software or firmware code. Software, smart device application(s), firmware, and control hardware can be designed to implement the systems and methods based on the description herein.

While all of the above functions are described to be provided to users via a mobile application on a smartphone, one of ordinary skill will recognize that any computing device including tablets, laptops, and general purpose computing devices may be used as well. In at least one embodiment, all of the services described herein are provided using web pages being accessed from the web server 201 using a web browser such as Safari™, Firefox™, Chrome™ DuckDuckGo™, and the like. All of the screen examples described herein show user interface elements that provide the functionality of the present invention. The arrangement, organization, presentation, and use of particular user input/output (I/O) elements including hyperlinks, buttons, text fields, scrolling lists, and similar I/O elements are shown herein for example embodiments only to more easily convey the features of the present invention. The scope of the present invention should not be interpreted as being limited by any of these elements unless expressly recited within the attached claims.

For the purposes of the example embodiment of FIG. 1, various functions are shown to be performed on different programmable computing devices that communicate with each other over the Internet 105. These computing devices may include smartphones 101*a*, laptop computers 101*b*, tablets (not shown), and similar devices so long as the disclosed functionality of the mobile application described herein is supported by the particular computing device. One of ordinary skill will recognize that this functionality is grouped as shown in the embodiment for clarity of description. Two or more of the processing functions may be combined onto a single processing machine. Additionally, it may be possible to move a subset of processing from one of the processing systems shown here and retain the functionality of the present invention. The attached claims recite any required combination of functionality onto a single machine, if required, and all example embodiments are for descriptive purposes.

For all of the above devices that are in communication with each other, some or all of them need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects, and in order to more fully illustrate one or more aspects. Similarly, although process steps, method steps, algorithms or the like may be described in a sequential order, such processes, methods, and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method or algorithm is carried out or executed. Some steps may be omitted in some aspect or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC) or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example, an end-user computer system, a client computer, a network server or other server system, a mobile computing device (e.g., tablet computing device, mobile phone, smartphone, laptop or other appropriate computing device), a consumer electronic device, a music player or any other suitable electronic device, router, switch or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines or other appropriate virtual environments).

Figure 2A:
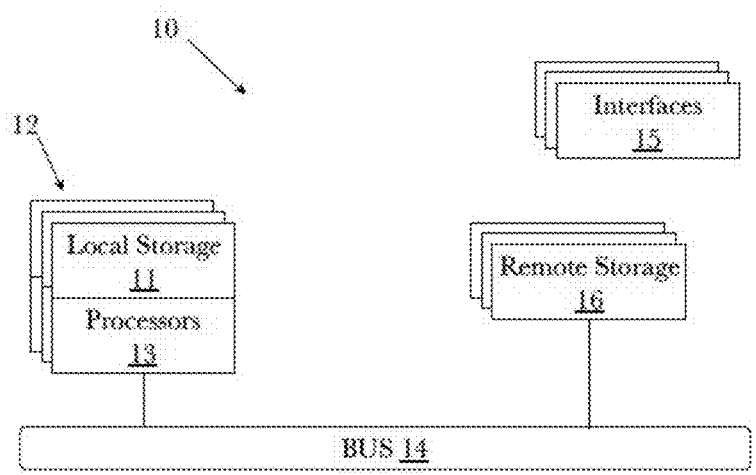
FIG. 2a is a block diagram illustrating an exemplary hardware architecture of a computing device.

Referring now to FIG. 2a, there is a block diagram depicting an exemplary computing device 10 suitable for implementing at least a portion of the features or functionalities disclosed herein. A computing device 10 may be, for example, any one of the computing machines listed in the previous paragraph, or indeed any other electronic device capable of executing software- or hardware-based instructions according to one or more programs stored in memory. A computing device 10 may be configured to communicate with a plurality of other computing devices, such as clients or servers, over communications networks such as a wide area network, a metropolitan area network, a local area network, a wireless network, the Internet or any other network, using known protocols for such communication, whether wireless or wired.

In one aspect, a computing device 10 includes one or more central processing units (CPU) 12, one or more interfaces 15, and one or more buses 14 (such as a peripheral component interconnect (PCI) bus). When acting under the control of appropriate software or firmware, a CPU 12 may be responsible for implementing specific functions associated with the functions of a specifically configured computing device or machine. For example, in at least one aspect, a computing device 10 may be configured or designed to function as a server system utilizing a CPU 12, local memory 11 and/or remote memory 16, and interface(s) 15. In at least one aspect, a CPU 12 may be caused to perform one or more of the different types of functions and/or operations under the control of software modules or components, which for example, may include an operating system and any appropriate applications software, drivers, and the like.

A CPU 12 may include one or more processors 13 such as for example, a processor from one of the Intel, ARM, Qualcomm, and AMD families of microprocessors. In some aspect, processors 13 may include specially designed hardware such as application-specific integrated circuits (ASICs), electrically erasable programmable read-only memories (EEPROMs), field-programmable gate arrays (FPGAs), and so forth, for controlling operations of a computing device 10. In a particular aspect, a local memory 11 (such as non-volatile random access memory (RAM) and/or read-only memory (ROM), including for example, one or more levels of cached memory) may also form part of a CPU 12. However, there are many different ways in which memory may be coupled to a system 10. Memory 11 may be used for a variety of purposes such as, for example, caching and/or storing data, programming instructions, and the like. It should be further appreciated that a CPU 12 may be one of a variety of system-on-a-chip-(SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may, for example, support other peripherals used with a computing device 10. Among the interfaces that may be provided are ethernet interfaces, frame relay interfaces, cable interfaces, DSL interfaces, token ring interfaces, graphics interfaces, and the like. In addition, various types of interfaces may be provided such as, for example, universal serial bus (USB), serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast ethernet interfaces, gigabit ethernet interfaces, serial ATA (SATA) or external SATA (ESATA) interfaces, high-definition multimedia interfaces (HDMI), digital visual interfaces (DVI), analog or digital audio interfaces, asynchronous transfer mode (ATM) interfaces, high-speed serial interfaces (HSSI), point of sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 2a illustrates one specific architecture for a computing device 10 for implementing one or more of the aspects described herein, it is by no means the only device architecture on which at least a portion of the features and techniques described herein may be implemented. For example, architectures having one or any number of processors 13 may be used and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and a server system (such as a server system described in more detail below).

Regardless of network device configuration, the system of an aspect may employ one or more memories or memory modules (for example, remote memory block 16 and local memory 11) configured to store data, program instructions for the general-purpose network operations or other information relating to the functionality of the aspects described herein (or any combinations of the above). Program instructions may control execution of or comprise an operating system and/or one or more applications, for example. Memory 16 or memories 11, 16 also may be configured to store data structures, configuration data, encryption data, historical system operations information or any other specific or generic non-program information described herein.

Because such information and program instructions may be employed to implement one or more systems or methods described herein, at least some network device aspects may include non-transitory machine-readable storage media, which, for example, may be configured or designed to store program instructions, state information, and the like for performing various operations described herein. Examples of such non-transitory machine-readable storage media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device) or they may be removable such as swappable flash memory modules (such as "thumb drives" or other removable media designed for rapidly exchanging physical storage devices), "hot-swappable" hard disk drives or solid state drives, removable optical storage disks, or other such removable media, and that such integral and removable storage media may be utilized interchangeably. Examples of program instructions include both object code, such as may be produced by a compiler, machine code, such as may be produced by an assembler or a linker, byte code, such as may be generated by for example by a JAVA™ compiler and may be executed using a JAVA™ virtual machine or equivalent, or files containing higher level code that may be executed by the computer using an interpreter (for example, scripts written in Python™, Perl™, Ruby™, Groovy™, or any other scripting language).

Figure 2B:
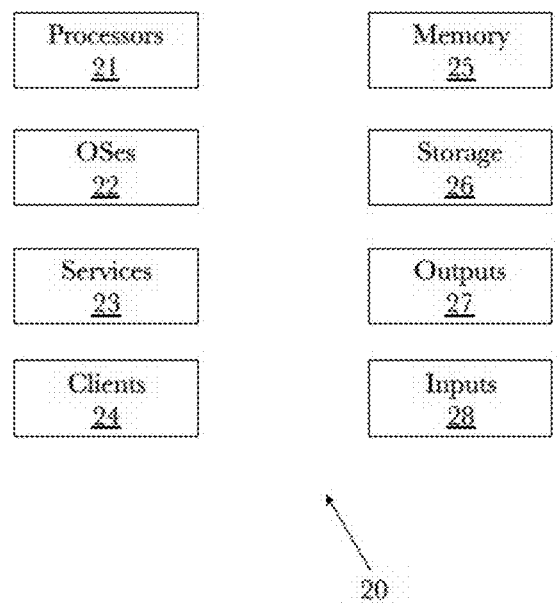
FIG. 2b is a block diagram illustrating an exemplary logical architecture for a client device.

In some aspects, systems may be implemented on a standalone computing system. Referring now to FIG. 2b, there is a block diagram depicting a typical exemplary architecture of one or more aspects or components thereof on a standalone computing system. A computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the LINUX™ operating system, ANDROID™ operating system or the like. In many cases, one or more shared services 23 may be operable in a system 20, and may be useful for providing common services to client applications 24. Services 23 may, for example, be WINDOWS™ services, user-space common services in a LINUX™ environment or any other type of common service architecture used with an operating system 22. Input devices 28 may be of any type suitable for receiving user input including, for example, a keyboard, touchscreen, microphone (for example, for voice input), mouse, touchpad, trackball or any combination thereof. Output devices 27 may be of any type suitable for providing output to one or more users, whether remote or local to system 20, and may include, for example, one or more screens for visual output, speakers, printers or any combination thereof. Memory 25 may be RAM having any structure and architecture known in the art for use by processors 21, for example to run software. Storage devices 26 may be any magnetic, optical, mechanical, memristor or electrical storage device for storage of data in digital form (such as those described above, referring to FIG. 2a). Examples of storage devices 26 include flash memory, magnetic hard drive, CD-ROM, and the like.

Figure 2C:
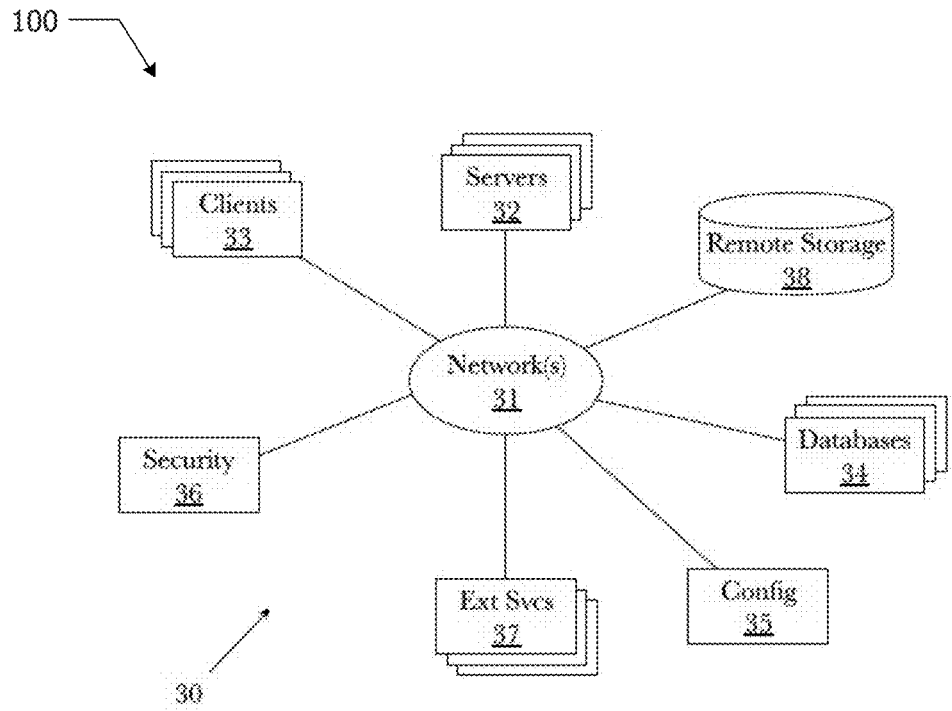
FIG. 2c is a block diagram showing an exemplary architectural arrangement of clients, servers, and external services.

In some aspects, systems may be implemented on a distributed computing network, such as one having any number of clients and/or servers. Referring now to FIG. 2c, there is a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 2b. In addition, any number of servers 32 may be provided for handling requests received from one or more clients 33. Clients 33 and servers 32 may communicate with one another via one or more electronic networks 31 which may be in various aspects any Internet, wide area network, mobile telephony network (such as CDMA or GSM cellular networks), wireless network (such as WiFi, WiMAX, LTE, and so forth) or local area network (or indeed any network topology known in the art; the aspect does not prefer any one network topology over another). Networks 31 may be implemented using any known network protocols, including, for example, wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored on a server system 32 in the Cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and use a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system or a logical database within an overall database management system. Unless a specific meaning is specified for a given use of the term "database," it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web system. It should be understood by one having ordinary skill in the art that any configuration or security subsystems known in the art now or in the future may be used in conjunction with aspects without limitation, unless a specific security 36 or configuration system 35 or approach is required by the description of any specific aspect.

Figure 2D:
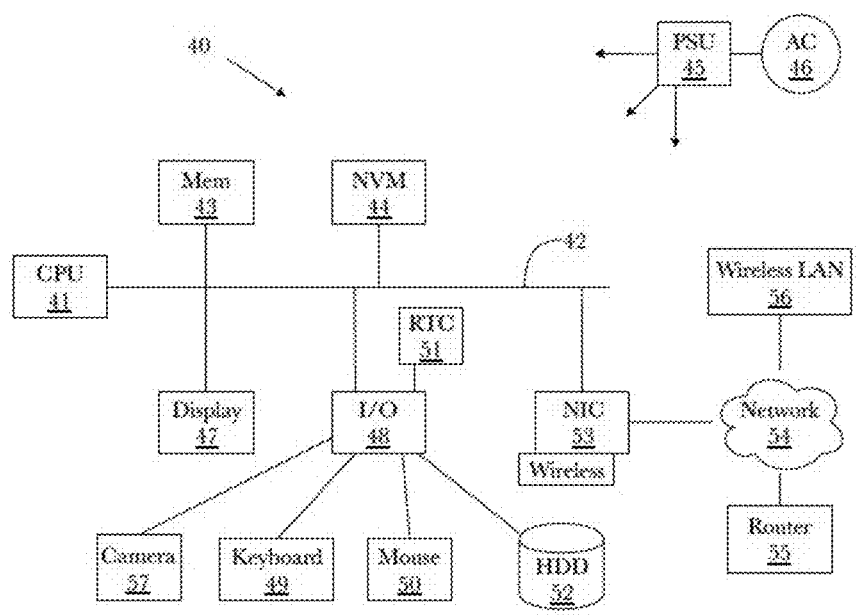
FIG. 2d is another block diagram illustrating an exemplary hardware architecture of a computing device.

FIG. 2d shows an exemplary overview of a computer system 40 as may be used in any of the various locations throughout the system. It is exemplary of any computer that may execute code to process data. Various modifications and changes may be made to a computer system 40 without departing from the broader scope of the system and method disclosed herein. A CPU 41 is connected to a bus 42, to which bus is also connected to memory 43, non-volatile memory 44, display 47, I/O unit 48, and network interface card (NIC) 53. An I/O unit 48 may, typically, be connected to peripherals such as a keyboard 49, pointing device 50, hard disk 52, real-time clock 51, camera 57, and other peripheral devices. A NIC 53 connects to a network 54, which may be the Internet or a local network, which local network may or may not have connections to the Internet. The system may be connected to other computing devices through the network via a router 55, wireless local area network 56 or any other network connection. Also shown as part of a system 40 is a power supply unit 45 connected, in this example, to a main alternating current (AC) supply 46. Not shown are batteries that could be present and many other devices and modifications that are well known, but are not applicable to, the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles or other integrated hardware devices).

In various aspects, functionality for implementing systems or methods of various aspects may be distributed among any number of client and/or server components. For example, various software modules may be implemented for performing various functions in connection with the system of any particular aspect, and such modules may be implemented to run on server and/or client components.

FIG. 3 illustrates an example embodiment of an electronic document available to mobile application users to obtain motor vehicle government services according to the present invention. FIG. 3 shows a web page 300 provided to a user/driver when interacting with the system 100. The driver selects one of the check boxes on the web page 300 to indicate which of the available governmental services is desired during a current session. This web page 300 may include vehicle- and driver-related choices such as update address 301a, update vehicle information 301b, obtain a copy of a driver's license 301c, obtain a driving record 301d, and schedule to take a driving exam 301e. Other governmental services such as requesting a copy of Social Security information 302a, request a work permit 302b, obtain a copy of a birth certificate 302c, and pay taxes for the year 302d also may be accessed from the web page 300. Important related but non-governmental information such as searching for attorneys to assist an individual with these governmental services 303 may be searched from the web site 300 as well. Of course, other related and unrelated interactions also may be presented on the web page 300.

FIG. 4 illustrates an example embodiment of an electronic document available to mobile application users to notify a user of a parking ticket according to the present invention. Now consider the receipt and processing of a parking ticket 400 from its generation to payment or adjudication. FIG. 4 shows a web page 400 that accepts information from a driver to register one or more vehicles with the system 100. The web page 400 requests the driver's name 401 and address 402, information identifying one or more vehicles 403a-c, and a selection of user preferences/settings for the system to process items 404.

These settings 404 may include a photo of the individual 405a, a password 405b, a selection of one or more vehicles to generate an electronic warning upon receipt of a parking ticket 405c, removal of a particular vehicle from the system 405d, an individual's driving status 405e, a vehicle status 405f, selection for 30-day alerts to be sent to the driver for particular events 405g, and selection for 24-hour alerts be sent to the driver for additional events 405h. Entering and submission of this information updates a system 100 database when a parking ticket is processed.

FIG. 5 illustrates an example embodiment of an electronic document to request a hearing or to pay a parking ticket according to the present invention. FIG. 5 shows a web page 500 used by a driver to pay for a parking ticket or request a hearing for the ticket issued to the driver's vehicle. The web page 500 accepts the driver's name and address 501, payment such as credit card information 502, a table of payment items 503, and user preference settings 505 for saving or requesting a copy of the payment as a receipt.

The driver selects one or more of the entries from the table of payment items 503 that may include payment of vehicle excise taxes 504a, payment of booth parking tickets 504b, payment or appeal of a parking ticket 504c, payment or appeal of a moving violation 504d, payment or appeal of a residential parking ticket 504e, and payment of any other type of ticket 504f. The driver selects the check box for the desired entry and fills in the amount to be paid. When the completed web page 500 is submitted, the selected item or items are paid using the listed credit card 502.

Figure 6A:
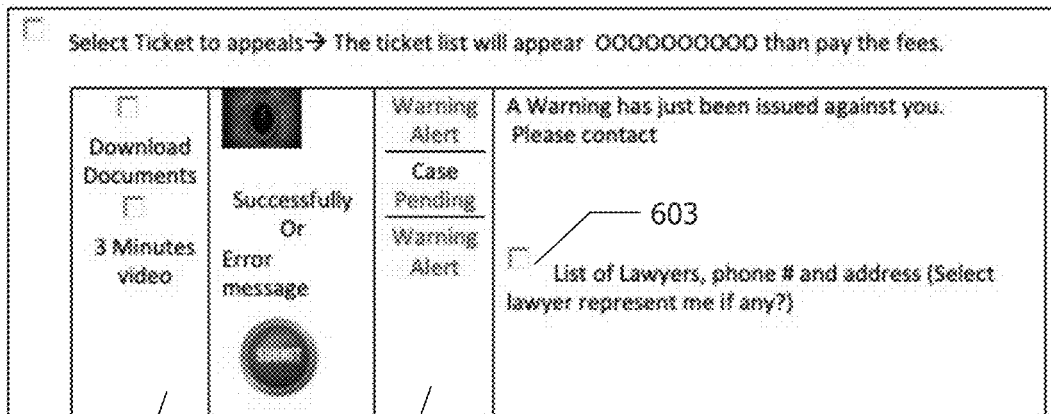
FIGS. 6a-b illustrate an example embodiment of an electronic document providing notice of a parking ticket and a scheduled hearing for a parking ticket according to the present invention.
Figure 6B:
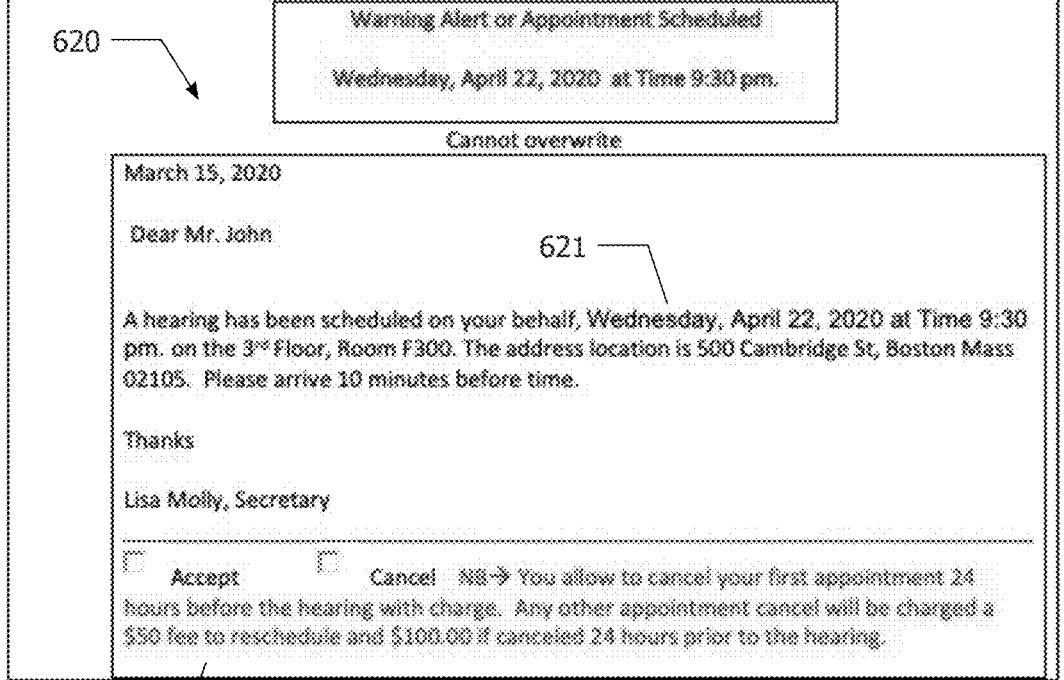

FIGS. 6a-b illustrate an example embodiment of an electronic document to providing notice of a parking ticket and a scheduled hearing for a parking ticket according to the present invention. FIG. 6a shows an electronic notice provided to a driver on his/her mobile application by the system 100. The notice 600 provides links 601 to download information specific to the particular ticket and supporting information on responding to the ticket. The notice 600 also provides warnings 602 of the status of the ticket. Finally, the notice 600 provides a link 603 to request one or more interested attorneys to contact the driver to provide assistance in handling this matter.

FIG. 6b shows a notice of a hearing 620, including its date, time and location 621 and links to accept or reject the scheduled hearing 622. Submission of the notice 620 informs the courts that the driver intends to appear at the stated location at the provided date and time.

FIG. 7 illustrates an example embodiment of an electronic document to set up or update a driver's account information within the system 100 according to the present invention. In order for a driver to use these web pages to interact with the appropriate governmental institutions, the driver must set up an account to identify the driver to the system as well as provide address and other contact information, identification of the driver's vehicles, and authentication information to protect the driver's account from misuse by unauthorized individuals. The web pages start an authentication process with a password that is entered along with a unique userID. If the driver does not recall the password for this account, the system 100 may prompt the driver to answer one or more security questions. Correctly answering these questions provides the system 100 with a level of confidence that the user attempting to use a particular account is the registered driver. The web page 700 shown in FIG. 7 permits a driver to create or update this authentication information. The security questions 701a-c are shown and allowed to be updated by selecting new questions and entering corresponding answers.

The system 100 may also use a two-factor authentication process in which an attempt to login generates a message to a registered address such as a mobile number or an email address of the driver. The message may include a unique code which is valid for a short period of time that the driver enters into the system 100 upon receipt. Such a two-factor process requires the user logging into the system 100 or changing the password/questions to have access to a cell phone or email address of the individual who set up the account.

Figure 8A:
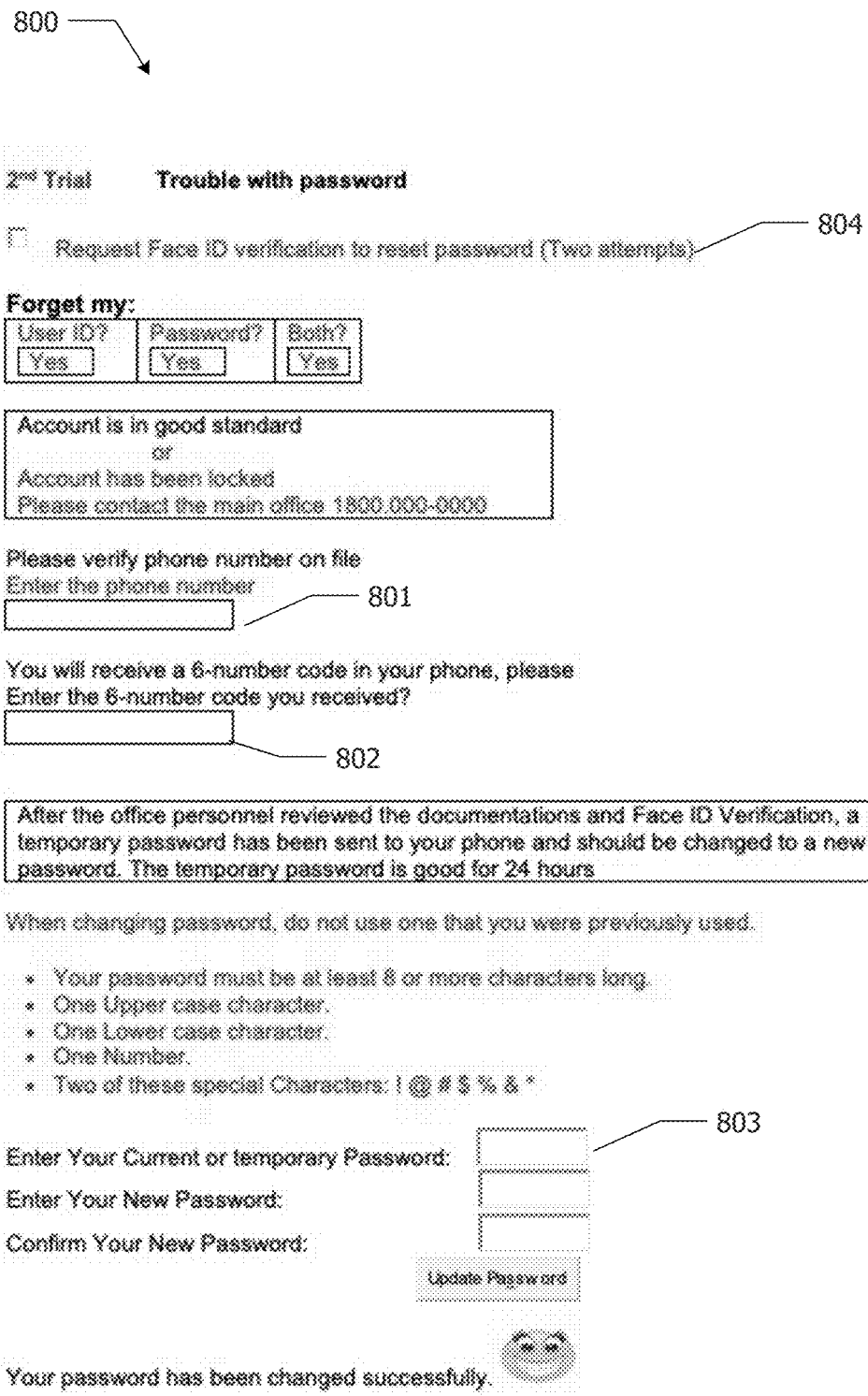

FIG. 8a-d illustrate an example embodiment of an electronic document to provide help to and a mechanism by which a user may update an account password for the system 100 according to the present invention. FIG. 8a shows a web page 800 that provides the driver with the ability to enter into the system identifying information to change a password as discussed above. The web page 800 may include entry of a known cell number 801 and the unique code 802 sent as part of the two-factor authentication.

The web page 800 also includes fields 803 to update a known password. For user's who have smartphones with a capability to authenticate an individual using a photograph of the individual's face, such as a FaceID™ system available on some of the iPhone™ models from Apple™ also may be used with the web page 800 using the link 804.

FIGS. 8*b*-*d* show a search for help results page or a Frequently Asked Questions web page 850 that is provided to uses to assist them in responding to parking tickets and the like.

Figure 9:
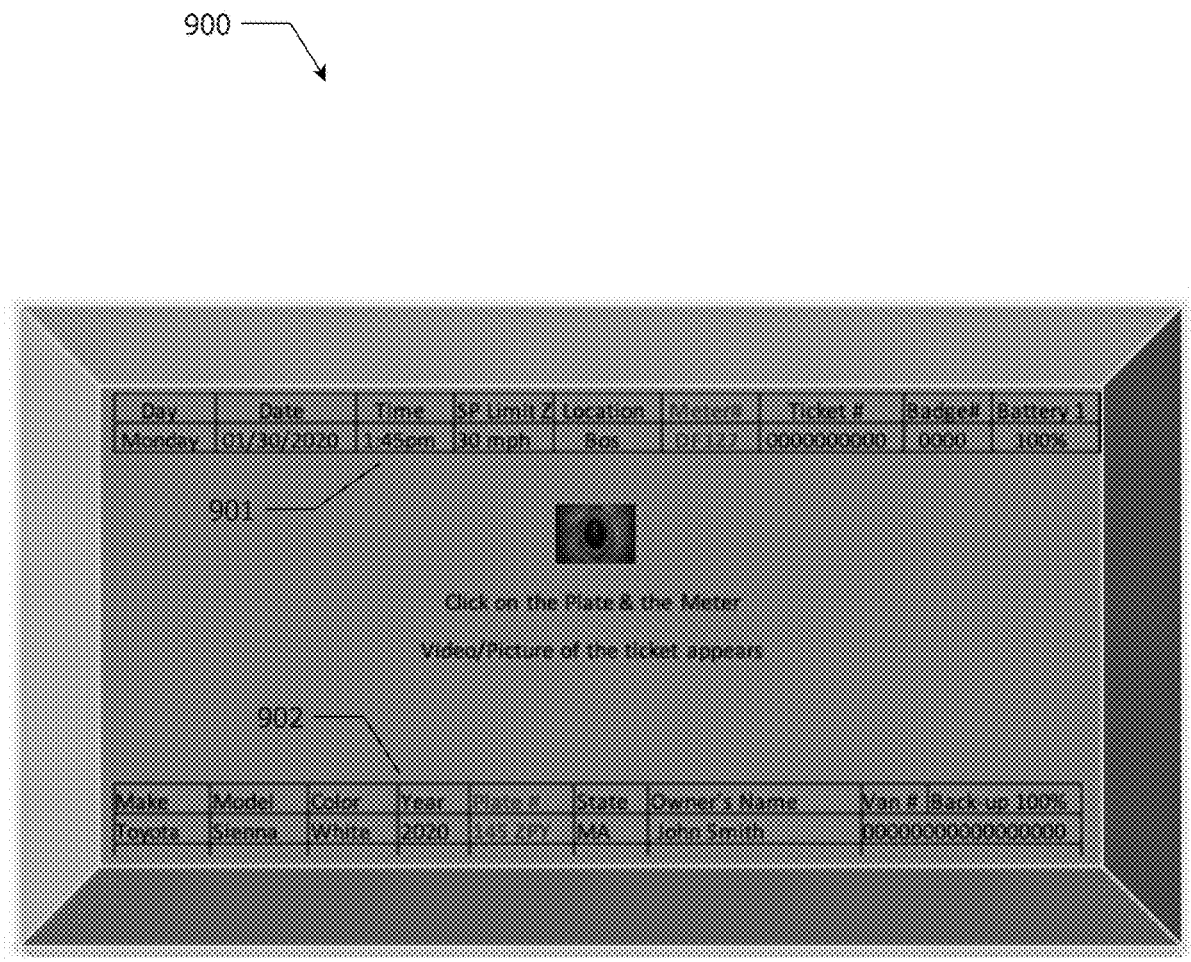
FIG. 9 illustrates an example embodiment of an electronic document to request a hearing or to pay a parking ticket according to the present invention.

FIG. 9 illustrates an example embodiment of an electronic document to request a hearing or to pay a parking ticket according to the present invention. FIG. 9 shows an initial display page 900 shown to a parking enforcement agent using their mobile ticketing device 103. The display 800 shows the date, time, and location of the infraction 901 as well as the vehicle identification 902 entered into the system. As described above, the parking enforcement agent may use his/her mobile ticketing device 102 to obtain a photograph and/or a video showing the vehicle being ticketed. The mobile ticketing device 102 may determine its location using GPS, cellular tower triangulation or Wifi location identification to populate the date, time, and location data 901. License plate recognition may obtain the vehicle information 902 from the photographs or video images obtained by the parking enforcement agent. This information is used when generating a ticket.

FIGS. 10-11 illustrate an example embodiment of an electronic document to issue a parking ticket according to the present invention. FIG. 10 shows a first of two pages 1000 of violations that may be issued by the parking enforcement agent. FIG. 11 shows a second of two pages 1100 of violations that may be issued by the parking enforcement agent. The parking enforcement agent checks off one or more boxes corresponding to the violations being issued from a table of citations. The table identifies the names of the citations in the vertical axis of the table and the location or zone of the citation along the horizontal access. By selecting a box, the selected citation/location combination is used to generate the issued citation. The parking enforcement agent or the system 100 itself may enter the fine assessed for a selected citation that is issued for a particular vehicle. An example mobile ticketing device 1010 also is shown in FIG. 10.

FIG. 12 illustrates a flowchart corresponding to a method performed by software components in a system providing automated parking ticket issuance according to the present invention. The process of issuing a ticket 1200 is shown in FIG. 12 that the mobile ticketing device 102 performs. The process begins when the parking enforcement agent takes a photograph of the vehicle in step 1201. Next in step 1202, the parking enforcement agent enters into the citation all of the relevant information such as location information 901 obtained by the device 102, date and time information 901 also obtained by the device 102, vehicle information 902 obtained from identification of the license plate seen in the obtained photograph, and selection of one or more citations to be issued from the table of citations as noted in FIGS. 10-11.

In step 1203, the photo and ticket information is formally transmitted to the parking authority or relevant web server 103 for inclusion into the appropriate governmental institutions. Test step 1204 determines whether or not the license plate information identifies the vehicle as being registered as an in-state vehicle, and if not, out of state DMV information is obtained in step 1205; otherwise the process 1200 immediately transmits the photo and ticket to the appropriate DMV for record-keeping purposes as well as any other process the DMV chooses to follow. Test step 1207 determines whether or not the license plate information matches the vehicle information, and if not, the system 100 notifies the parking enforcement agent and any responsible towing/impound entity in step 1208 that the vehicle should be removed from its location before the process 1200 ends.

When test step 1207 determines that the license plate information matches the vehicle information, a copy of the ticket/photo is forwarded to all relevant systems for further processing in step 1209 and notice of the issuance of the ticket is sent to the driver in step 1210 before the process 1200 ends.

Figure 13:
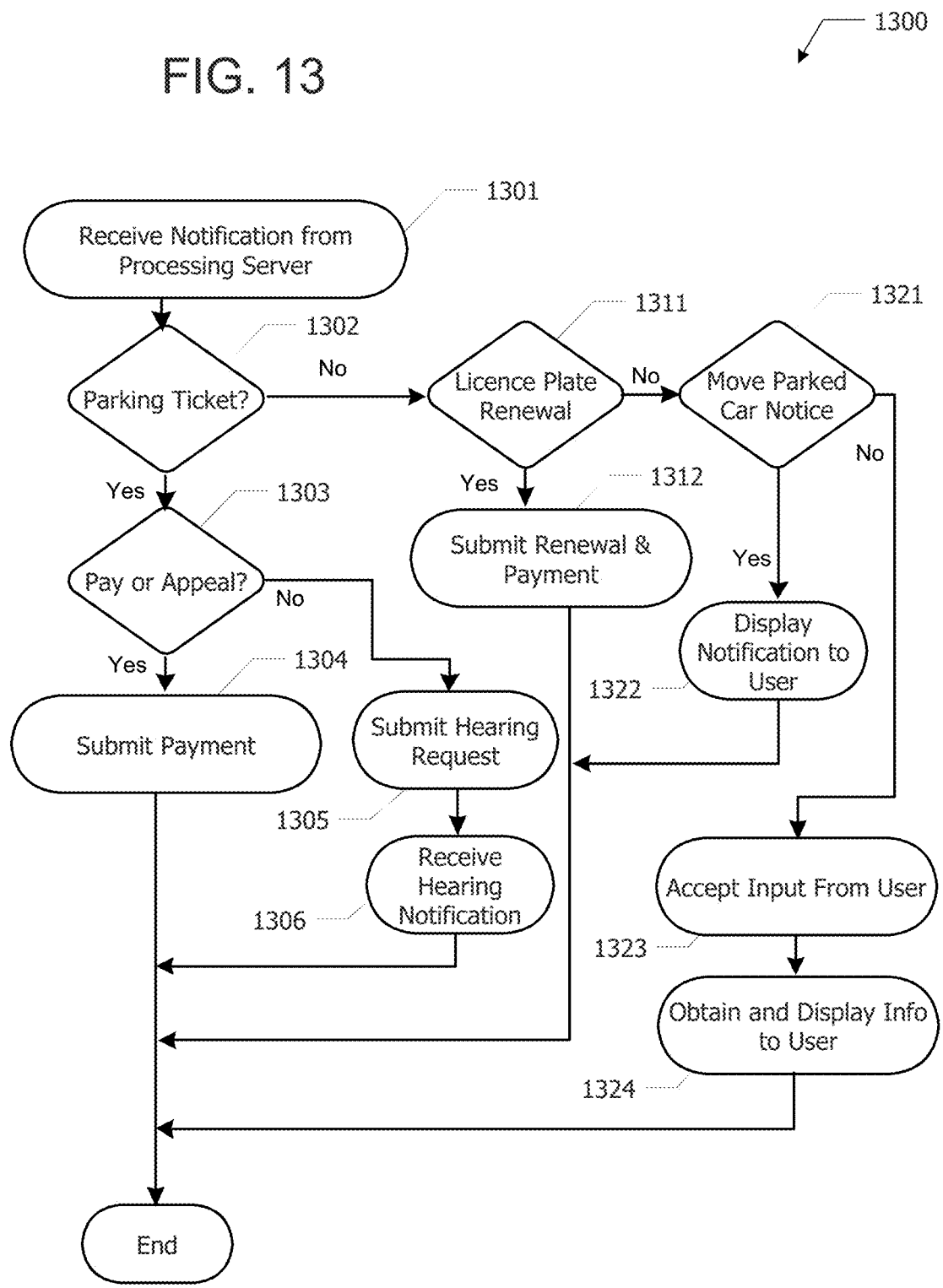
FIG. 13 illustrates a flowchart corresponding to a method performed by software components in a system of a user's mobile application providing automated motor vehicle notifications and services according to the present invention.

FIG. 13 illustrates a flowchart corresponding to a method performed by software components in a system of a user's mobile application providing automated motor vehicle notifications and services according to the present invention. The process 1300 begins when a user receives a notification from the system 100 on a mobile device 101*a*-*c*. As noted above, the notifications may include receipt of a parking ticket, a license plate registration renewal, a move vehicle 24-hour notification, and other user selected options. The incoming notification is received in step 1301 by the mobile device 101*a*-*c*. Test step 1302 determines whether the received notification is issuance of a parking ticket, and if so, is presented to the user. In test step 1303, the user indicates whether the ticket is to be paid or appealed. If the ticket is to be paid, the payment information for the user is obtained and submitted to the system 100 and the process ends. If the ticket is not to be paid and appealed, a request for a hearing is made in step 1305 by submitting a request to the system. A hearing will be scheduled, and a notice of the date, time, and location of the hearing is received in step 1306 before the process 1300 ends.

Returning to test step 1302, when the received notification is not a parking ticket, test step 1311 determines whether the notification is a renewal of the license plates for the vehicle, and if so, the user instructs the mobile device 101*a*-*c* to submit the renewal request and payment in step 1312 and the process 1300 again ends. When test step 1311 determines that the notification is not a license plate renewal, test step 1321 determines whether it's the notification of a move a parked car notice. As noted above in reference to FIG. 4, the system 100 may provide 24-hour notification of a requirement to move vehicles, for example for street cleaning or snow removal. When test step 1321 determines that the notification is a 24-hour move notice, the notification is provided to the user using a defined notification method. For example, the user may request that this notice be presented as an alarm that must be disabled by the user to ensure that the notice is not missed. The user also may choose to have the notice merely presented as a pop-up message that needs to be cleared the next time the user wakes up the mobile device 101*a*-*c*. Once the appropriate notification has been provided to the user, the process 1300 ends.

Returning to test step 1321, when the test step determines that the notification received is not a move parked vehicle notice, the process 1300 continues to step 1323 in which the process awaits input from the user in response to receipt and presentation of the received notification. The process 1300 continues in response to a user's input to obtain any needed information and to perform any needed operations before the process 1300 ends.

The embodiments described herein are implemented as logical operations performed by a computer. The logical operations of these various embodiments of the present invention are implemented (1) as a sequence of computer-implemented steps or program modules running on a computing system and/or (2) as interconnected machine modules or hardware logic within the computing system. The implementation is a matter of choice dependent on the performance requirements of the computing system implementing the invention. Accordingly, the logical operations making up the embodiments of the invention described herein can be variously referred to as operations, steps, or modules.

Even though particular combinations of features are recited in the present application, these combinations are not intended to limit the disclosure of the invention. In fact, many of these features may be combined in ways not specifically recited in this application. In other words, any of the features mentioned in this application may be included to this new invention in any combination or combinations to allow the functionality required for the desired operations.

No element, act, or instruction used in the present application should be construed as critical or essential to the invention unless explicitly described as such. Further, the phrase "based on" is intended to mean "based, at least in part, on" unless explicitly stated otherwise. Any singular term used in this present patent application is applicable to its plural form even if the singular form of any term is used.

In the present application, all or any part of the invention's software or application(s) or smart device application(s) may be installed on any of the user's or operator's smart device(s), any server(s) or computer system(s) or web application(s) required to allow communication and transfer of content(s) or data between any combination of the components.

What is claimed is:

1. A system for providing an automated motor vehicle notifications and services system, the system comprising:
   a memory having instructions stored thereon;
   a web-based computing system; and
   a processor configured to execute the instructions on the memory to cause an electronic apparatus to:
   obtain photograph of a vehicle license plate for a violating vehicle;
   accept input defining a violation associated with the violating vehicle to generate an electronic parking ticket from a parking official;
   transmit the photograph and the electronic parking ticket to the web-based computing system;
   the web-based computing system comprising:
   a first website associated with a parking authority;
   a second website associated with a state motor vehicle authority; and
   a third website associated with a local court;
   the processor further configured to cause the electronic apparatus to:
   obtain an online address of the second website associated with the state motor vehicle authority in a state matching the license plate;
   transmit the photograph and electronic ticket to the second website associated with the state motor vehicle authority;
   verify the license plate matches the violating vehicle through the second website;
   when the license plate does not match the violating vehicle, notify a responsible agent through the first website associated with the parking authority to dispatch a tow truck to remove the violating vehicle; and
   transmit the photograph and the electronic parking ticket to a web-based driver notification computing system instructing the driver notification computing system to serve notice of the electronic ticket on an owner of the violating vehicle from the third website associated with the local court;
   wherein the system provides integrated access to the first website, the second website, and the third website of the web-based computing system without an artificial separation between a plurality of associated governmental institutions;
   the plurality of governmental institutions comprising the parking authority, the state motor vehicle authority, and the local court.

2. The system according to claim 1, wherein the processor further execute instructions to accept payment of a fine from the owner of the violating vehicle.

3. The system according to claim 1, wherein the processor further execute instructions to accept a request to challenge the parking ticket from the owner of the violating vehicle.

4. The system according to claim 3, wherein the processor further execute instructions to:
   schedule a hearing for litigating the violation associated with the parking ticket;
   transmit notice of the hearing to the owner of the violating vehicle; and
   transmit notice of the hearing to the parking official associated with the generation of the parking ticket.

5. The system according to claim 1, wherein the system wherein the processor further execute instructions to provide notice of an outcome of the hearing to the owner of the violating vehicle, the parking authority, and the state motor vehicle authority.

* * * * *